R. SPRINGBORN.
VALVE OPERATING MECHANISM.
APPLICATION FILED JULY 31, 1918.

1,300,785.

Patented Apr. 15, 1919.

Inventor.
Richard Springborn
by Brackett & Hyde
Att'ys

UNITED STATES PATENT OFFICE.

RICHARD SPRINGBORN, OF CLEVELAND, OHIO.

VALVE-OPERATING MECHANISM.

1,300,785.   Specification of Letters Patent.   Patented Apr. 15, 1919.

Application filed July 31, 1918. Serial No. 247,529.

*To all whom it may concern:*

Be it known that I, RICHARD SPRINGBORN, a citizen of the United States, residing at Cleveland, in the county of Cuyahoga and State of Ohio, have invented certain new and useful Improvements in Valve-Operating Mechanism, of which the following is a specification.

This invention relates to valves such as are used upon steam or liquid lines where the fluid travels under pressure, and has more particular reference to what are known as non-packing valves.

The object of the invention is to provide improved valve operating mechanism capable of embodiment in new valves or designed for convenient attachment to old valves, and which does away entirely with ordinary packing structures and absolutely seals the valve against leakage of the fluid passing therethrough.

A further object of the invention is to provide a construction of this kind which can be manufactured cheaply, which does not get out of order in service, and which can be designed for attachment to a valve in use without any modification of said valve by cutting or forming tools, and which also can be attached to the valve without removal of its bonnet.

A further object of the invention is to provide valve operating mechanism of the kind described embodying a special form of spring which does not lose its temper and therefore will preserve its resiliency and which does away with the usual replacements on account of breakage or loss of resiliency.

Further objects of the invention are in part obvious and in part will appear more in detail hereinafter.

Figure 1:
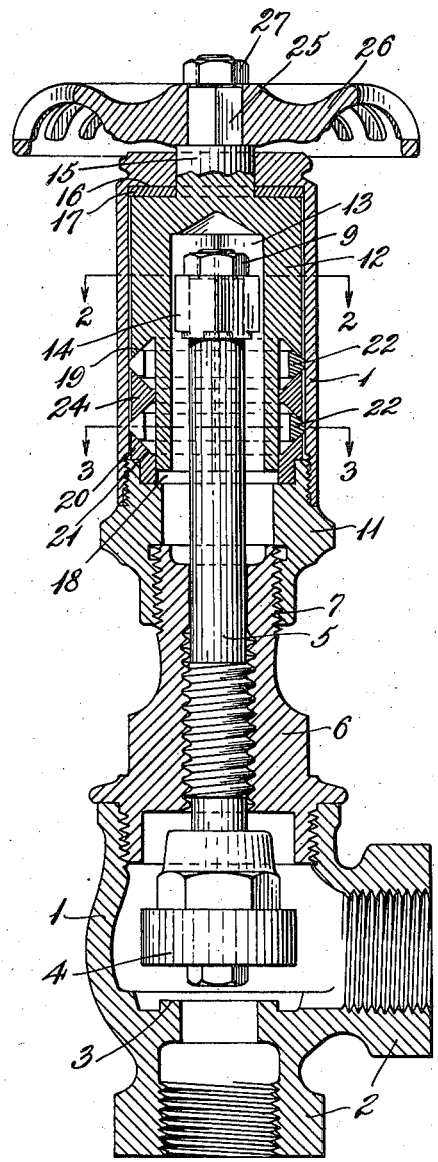
Figure 2:
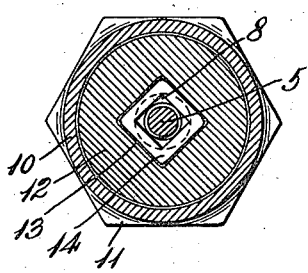
Figure 3:
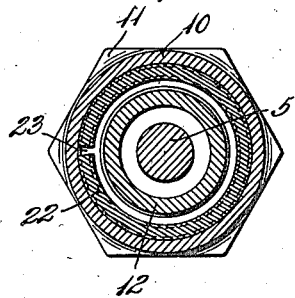

In the drawings, which represent one embodiment of the invention, Figure 1 is a sectional elevation; Fig. 2 is a detail cross section on the line 2—2, Fig. 1; and Fig. 3 is a cross section on the line 3—3, Fig. 1.

The invention may be designed for use with any desired form of valve structure, as the invention is more particularly concerned with the mechanism or device for actuating the valve stem and preventing leaks of fluid along said stem. For purposes of illustration the drawings show one ordinary form of L-valve including a hollow body or casing 1 provided with the usual internally threaded hexagons 2 for connection to the line, and between which is the valve seat 3 with which coöperates a valve member 4 on one end of the rotary valve stem 5. Said stem has a threaded portion turning in threads of the bonnet 6, and extends outwardly beyond said bonnet, as is usual.

The valve so far described, as ordinarily placed upon the market, has the upper end of its bonnet threaded, as at 7, to receive the usual packing gland nut and ring (not shown), while the outer end of the stem is suitably formed to receive the valve manipulating member. Usually the valve stem has its outer end provided with a reduced squared portion 8 to fit a square hole in the operating hand wheel, outside of which the reduced portion of the stem is threaded to receive a securing nut 9.

Valves of this character usually give trouble at the packing gland around the stem which not only must be adjusted from time to time but also requires frequent renewal of the packing, and even then a pressure tight joint is not easily maintained. The application of the present invention to valves of this character is accomplished without any alteration of the valve by machine or other operations to reform or shape the metal. Consequently, the attachment can be readily applied to a valve in use without removing it and without modification of the valve other than by the omission of its packing gland nut, so that the valve bonnet, valve member, valve stem, and operating hand wheel are retained in the modified structure.

The valve attachment shown in the drawings includes a tubular outer casing 10 threaded upon a base or body 11 which is screwed upon the threaded upper end 7 of the valve bonnet and takes the place of the packing gland nut. Within said tubular member 10 is a hollow body 12 having a central hole 13 which is non-circular in cross section to afford driving connection with the valve stem. Preferably this hole is square in cross section to receive a square hollow block 14 which fits directly upon the reduced square portion 8 of the valve stem, and which takes the place of the usual operating hand wheel. The upper end of body 12 is closed and has a spindle end portion 15 extending out through an opening in the upper end of the tubular member 10, said spindle being suitably formed on its outer end to enable it to be turned. Since the tubular member 10 is anchored by the body 11 to the valve bonnet and casing it is clear that rotary motion of the spindle 15 will turn the valve stem and actuate the valve. During longitudinal motion of the valve stem the block 14 slides in the elongated opening 13.

The structure is sealed against the loss of pressure by yieldingly pressing the inner body 12 endwise against a seat 16 at the upper end of the tubular member 10, so that pressure cannot escape beyond this seat. The metal of the two members may directly contact or, if desired, a thin washer 17 of bearing metal may be introduced at the seat, although this is not essential. To produce and maintain the necessary yielding pressure at the seat the member 12 is made slightly shorter than the distance between the washer or seat and the member 11, as is indicated by the clearance at 18. The lower end of member 12 is also reduced, the shoulder thus formed being provided with a tapered seat 19, beyond which the reduced portion of member 12 is provided with a coöperating seat member 20 sleeved thereon and provided with a tapered seat 21. Between the two seats 19 and 21 are located one or more spring members, which may be of any suitable form. The drawings show two spring members, although one, three or more may be used according to the amount of longitudinal yield desired. Each of these spring members, indicated at 22, is in the form of a ring or annulus with opposite conical walls or surfaces to coöperate with the seats 19 and 21, said rings being preferably formed of cast metal, such as steel or iron, and being slotted or sawed at one point in their periphery to form a gap 23 Fig. 3. This enables the rings to be compressed inwardly toward the central axis and to thereby exert a resilient or cushioning effect by their tendency to spring outwardly to normal form. When two or more resilient rings are used a complemental abutment ring 24 is interposed between each two successive spring rings. This abutment ring is a solid complete annulus having no gap therein and has conical surfaces complemental to the adjacent surfaces of the rings.

When the device is assembled, as shown in Fig. 1, the casing 10 is screwed down home upon the body 11, so that the seat member 20 is forced inwardly and compresses the two rings 22, which therefore exert pressure on the seat 16 before referred to.

The spindle 15 may be manipulated in any manner, but preferably its outer end is squared, as at 25, to the same size as the reduced portion 8 of the original valve stem. Consequently, the valve operating wheel 26 which formed a part of the original valve and which was removed from the valve stem and replaced by the block 14, can be applied to the spindle 15, upon which it may be held either by a screw or by the nut 27 shown.

When the complete structure is assembled rotation of the wheel 26 produces rotation of the valve stem and actuates the valve member, but there is no longitudinal motion of the wheel 25. To state it in another way, the operating wheel is non-rising, and has a simple swiveling motion. In applying the invention to a valve already in use the only parts of said valve which are discarded are the packing gland nut and ring so that the invention does not involve material loss of metal and consequent increased cost, as is the case when the entire valve bonnet is replaced.

What I claim is:

1. An attachment for valves embodying the usual hollow body, bonnet, valve member, valve stem and valve operating hand wheel, said attachment comprising a hollow casing constructed at one end for attachment to the bonnet and being provided internally with valve stem operating means, said operating means at the other end of the casing having an exposed portion constructed and arranged to receive said hand wheel.

2. An attachment for valves embodying the usual hollow body, bonnet, valve member, valve stem and valve operating hand wheel, said attachment comprising a hollow casing constructed at one end for attachment to the bonnet and being provided internally with valve stem operating means, said operating means at the other end of the casing having an exposed portion constructed and arranged to receive said hand wheel, a seat within said casing, a coöperating seat on said operating means, and yielding means for holding said seats in engagement.

3. A valve attachment, comprising a tubular casing constructed at one end for attachment to a valve bonnet, a rotary member therein adapted to receive and drive the valve stem, means for turning said member, coöperating sealing seats on said member and casing, an annular inclined seat, and a split metal ring coöperating with said seat for maintaining engagement between said sealing seats.

In testimony whereof I affix my signature.

RICHARD SPRINGBORN.